United States Patent Office 3,211,544
Patented Oct. 12, 1965

3,211,544
METHOD OF CONTROLLING PLANT GROWTH
Kenneth P. Dubrovin, Leawood, Kans., assignor, by mesne assignments, to Gulf Oil Corporation, Pittsburgh, Pa., a corporation of Pennsylvania
No Drawing. Original application May 8, 1963, Ser. No. 278,974. Divided and this application Sept. 21, 1964, Ser. No. 417,256
1 Claim. (Cl. 71—2.6)

This invention relates to novel chemical compounds, herbicidal compositions containing these novel substances as active ingredients and to methods for controlling plant growth with such herbicidal compositions. This application is a division of copending U.S. application Ser. No. 278,974, filed May 8, 1963.

There are provided by this invention novel chemical compounds conforming to the general formula,

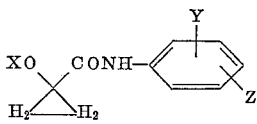

in which X is selected from the group consisting of 1 to 4 carbon alkyl- and chloroalkyl-substituents and Y and Z are selected from the group consisting of methyl-, chloro- and chloromethyl-substituents located in positions on the phenyl ring selected from the group consisting of the 3,4- and 2,5-positions with respect to the point of attachment of the nitrogen atom.

The substituted cyclopropanecarboxanilide herbicides described above can be formulated with inert carriers and with auxiliary agents such as solvents, penetrants, wetting agents, emulsifiers and the like to provide herbicidal compositions that can be used effectively to control plant growth, particularly for selective post-emergent control.

The following examples are set forth to illustrate more clearly the principle and practice of this invention to those skilled in the art.

EXAMPLE 1

(a) *Preparation of 4-chloro-2-methoxybutyronitrile.*—This compound was prepared by a procedure similar to that employed by Wilson and Henze in J. Am. Chem. Soc., 63, 2112 (1941), for the preparation of 4-chloro-1-ethoxybutyronitrile.

To 147 g. (1.1 mols) of silver cyanide dispersed in 300 ml. of anhydrous ether was added a solution of 140 g. (0.98 mol) of 1,3-dichloro-1-methoxy-propane in 250 ml. of anhydrous ether. Gentle refluxing occurred during the addition. After addition was complete, the slurry was stirred overnight at room temperature. The resulting reaction mixture was then filtered, and the ether was removed by distillation. The residue was then distilled to yield 78.1 g. of product boiling at 67–69° C. at 8 mm. Hg pressure; $n_D^{17}$ 1.4339.

(b) *Preparation of methyl 4-chloro-2-methoxybutyrate.*—A solution of 40 g. (0.3 mol) of 4-chloro-2-methoxy-butyronitrile in 80 ml. of methanol was saturated with hydrogen chloride at room temperature and then was refluxed for 16 hours. The reaction mixture was poured into 150 ml. of cold water, the organic layer was separated and the aqueous layer was extracted with three small portions of ether to recover additional product from the aqueous phase. The combined organic phases were dried and then distilled to yield 37 g. of product boiling at 93–96° C. at 18 mm. Hg; $n_D^{16}$ 1.4359.

(c) *Preparation of methyl 1-methoxycyclopropanecarboxylate.*—A mixture of 34.8 g. (0.21 mol) of methyl 4-chloro-2-methoxy-butrate, 150 ml. of benzene and sodamide freshly prepared from 5.3 g. (0.23 g. atom) of sodium was refluxed for 36 hours. Sufficient water was added to the cold reaction mixture to dissolve the water-soluble constituents of the mixture and the organic phase was separated, dried and filtered. So as to effect removal of unsaturated by-products, the filtrate was reacted with small portions of bromine dissolved in chloroform until reaction ceased, as indicated by failure to cause disappearance of the bromine color. After removal of benzene by distillation at atmospheric pressure, the residue was distilled to yield 12 g. of colorless liquid product, B.P. 77–80° C. at 43 mm. Hg; $n_D^{18}$ 1.4294.

(d) *Preparation of 3'-4'-dichloro-1-methoxycyclopropanecarboxanilide.*—A slurry of 17.9 g. (0.138 mol) of methyl 1-methoxycyclopropanecarboxylate, 22.4 g. (0.138 mol) of 3,4-dichloraniline, 9.0 g. (0.166 mol) of sodium methoxide and 210 ml. of benzene was stirred for 12 hours, during which time the benzene-methanol azetrope was slowly removed by distillation. The mixture was cooled, then 50 ml. of water and 15 ml. of concentrated hydrochloric acid in 40 ml. of water was added. The organic phase was separated, extracted with dilute hydrochloric acid, then with water and then dried and decolorized. After removal of benzene under reduced pressure, the residue was recrystallized from ligroin to yield 25 g. of product, M.P. 89–91° C.

EXAMPLES 2 AND 3

5'-chloro-2'-methyl - 1 - methoxycyclopropanecarboxanilide and 2',5'-dichloro-1-methoxycyclopropanecarboxanilide were prepared from methyl 1-methoxycyclocarboxylate and 5-chloro-2-methylaniline and 2,5-dichloroaniline respectively, by essentially the same procedure as employed in section (d) of Example 1 above.

The compounds of Examples 1, 2 and 3 were tested for post-emergence herbicidal activity on a variety of plants, according to the procedure described below.

An aqueous dispersion of the compound to be tested is prepared by combining 0.4 gram of the substance with 4 ml. of a solvent mixture (3 parts Emulphor EL–719 combined with one part xylene and 1 part kerosene) and then adding sufficient water to make a total volume of 40 ml. Emulphor EL–719 is described as a polyoxyethylated vegetable oil.

Oats, wheat, soybeans, flax, millet, alfalfa, tomato and sugar beets are planted in ordinary greenhouse potting soil in 4 inch pots which are placed in the greenhouse. Ten to eighteen days after the emergence of the plants, they are sprayed at a rate of 5 pounds of active compound per acre with the aqueous dispersions prepared according to the above procedure in a total spray volume of 60 gallons per acre. Seven days after application the plants are observed and results noted according to the following rating system:

C=Chlorosis
N=Necrosis
G=Growth inhibition
0=no effect
1=slight effect
2=moderate effect
3=severe effect
4=maximum effect or dead plants The results obtained with the compounds of Examples 1, 2 and 3 are shown in Table 1 below.

*Table 1.—Post-emergant activity (at application rate of 5 lb./acre*

|  | Oats | Wheat | Soybeans | Flax | Millet | Alfalfa | Tomato | Sugar Beets | Overall Activity |
|---|---|---|---|---|---|---|---|---|---|
| Example 1 | N1G1 | N1G1 | N2 | 4 | 4 | 4 | N3 | 4 | 3 |
| Example 2 | 0 | 0 | 0 | 0 | N2 | 0 | 0 | 0 | 1 |
| Example 3 | 0 | 0 | 0 | 0 | 0 | 0 | 0 | 0 | 0 |

The pre-emergence activity of the herbicidal agents of Examples 1, 2 and 3 was tested according to the following procedure:

Oats, soybeans, radish, flax, millet, alfalfa, sugar beets, bromegrass, cotton, coxcomb, corn and crabgrass are seeded in sandy soil in greenhouse flats.

Approximately 3 parts of active ingredient are dissolved in 2000 parts of acetone as inert carrier. The seeded flats are sprayed with this solution at the rate of 10 pounds of active compound per acre and are placed in the greenhouse. After 21 days the treated flats are examined and the results noted according to the same rating system used above. These results are shown in Table 2.

*Table 2—Pre-emergent activity (at application rate of 10 lb./acre)*

|  | Oats | Soybeans | Radish | Flax | Millet | Alfalfa | Sugar Beets | Brome Grass | Cotton | Coxcomb | Corn | Crabgrass |
|---|---|---|---|---|---|---|---|---|---|---|---|---|
| Example 1 | N3 | C1G2 | N4 | N4 | N4 | N4 | N4 | N4 | G2 | N4 | N4 | N4 |
| Example 2 | N2 | C3 | N4 | N4 | N4 | N4 | N4 | N3 | N4 | N4 | 0 | N4 |
| Example 3 | 0 | 0 | 0 | 0 | 0 | 0 | 0 | 0 | 0 | 0 | 0 | N2 |

Upon examination of the data presented in Tables 1 and 2, it will be seen that the compound of Example 1 shows both high post-emergent and pre-emergent activity. At proper application levels this substance possesses utility in the control of weeds in cotton. The compound of Example 2 shows utility in the control of weeds in corn. The compound of Example 3 possesses utility in the control of crabgrass.

The 1-alkoxycyclopropanecarboxanilides of the present invention show good activity against a number of plant species. They also show better selectivity against a number of closely related species than is usually observed with compounds having such a high degree of activity. The selectivity of kill can be enhanced by proper formulation and control of application rates. The 1-alkoxycyclopropanecarboxanilides have a high degree of resistance to most of the common soil microorganisms and, when used as pre-emergent herbicides, provide a high degree of control over an extended period of time.

The excellent herbicidal activity of the cyclopropanecarboxanilides of this invention requires the application of only small amounts of the active ingredient distributed uniformly over a wide area. Of course, this is difficult to do employing the pure material. However, by increasing the bulk of the material, such as by mixing the compound with an inert diluent or carrier, the application to growing plants and soil can be achieved more readily. Such carriers may be either solids, such as talc, clay, diatomaceous earth, sawdust, calcium carbonate or the like, or liquids such as water, kerosene, acetone, benzene, toluene, xylene, and the like, in which the active compound may be dissolved or dispersed.

Emulsifying agents preferably are used to achieve a suitable emulsion or dispersion in liquids such as water to give aqueous sprays. Emulsifying agents and wetting agents may also be used to aid in dispersing the active compound in liquids used as the carrier in which the compound is not completely soluble and to increase coverage by the active compound. Emulsifying agents and wetting agents, also known as "surface active agents," are sold under numerous trade marks and may be either pure compounds, mixtures of compounds of the same general group, or they may be mixtures of compounds of different classes.

There are thus also provided by this invention novel herbicidal compositions containing one or more of the described cyclopropanecarboxanilides intimately dispersed with or dissolved in a surface active agent. Typical satisfactory surface active agents which may be used are the alkali metal higher alkylarylsulfonates such as sodium dodecylbenzenesulfonate and the sodium salts of alkylnaphthalenesulfonic acids, fatty alcohol sulfates such as the sodium salts of the monoesters of sulfuric acid with n-aliphatic alcohols containing about eight to eighteen carbon atoms, long chain quarternary ammonium compounds, sodium salts of petroleum derived alkylsulfonic acids, polyethylene sorbitan monooleate, alkylarylpolyether alcohols, water-soluble lignin sulfonate salts, alkalicasein compositions, long chain alcohols usually containing about ten to eighteen carbon atoms, and condensation products of ethylene oxide with fatty acids, alkylphenols or mercaptans.

Other additives such as a lanolin or kerosene emulsion, or Tween–20 (a product described as sorbitan monolaureate polyoxyalkylene derivative), stickers and other auxiliary materials may be included in solid or liquid formulations to increase coverage of the active compound. These materials are also considered to be surface active agents.

The cyclopropanecarboxanilides of the invention can be used as herbicides at application rates of from about 20 pounds to as little as about 0.1 pound per acre. When the compounds are used as a pre-emergent herbicide, an application rate of about 0.5 to about 20 pounds per acre is normally used, with about 2 to about 10 pounds per acre being preferred. When they are used as a post-emergent herbicide, an application rate of about 0.01 to 20 pounds of one or more active compound per acre is used, with an application rate of about 0.1 to 3 pounds per acre being preferred. When using a water emulsion of the herbicide, a spray volume of about 1 to about 100 gallons of aqueous emulsion, and preferably about 5 to 40 gallons, per acre is used.

The above descriptions and particularly the examples are set forth for purposes of illustration only. Many variations and modifications thereof will be obvious to those skilled in the art and can be made without departing from the spirit and scope of the invention herein described.

What is claimed is:

The method of controlling plant growth which comprises applying to the locus of the plant a herbicidal quantity of a cyclopropanecarboxanilide conforming to the formula

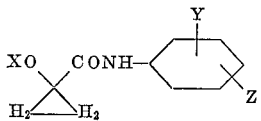

in which X is 1 to 4 carbon alkyl and Y and Z are selected from the group consisting of methyl, chloro and chloromethyl located in positions on the phenyl ring selected from the group consisting of the 3,4- and 2,5-positions with respect to the point of attachment of the nitrogen atom.

References Cited by the Examiner

UNITED STATES PATENTS

| | | | |
|---|---|---|---|
| 2,490,756 | 12/49 | Kenyon et al. | 260—562 X |
| 2,654,722 | 10/53 | Young et al. | 260—562 X |
| 2,692,282 | 10/54 | Brown | 260—557 |
| 2,723,192 | 11/55 | Todd | 71—2.6 |
| 2,726,150 | 11/55 | Wolter | 71—2.6 |
| 3,110,729 | 11/63 | Greene et al. | 260—557 |

JULIAN S. LEVITT, *Primary Examiner.*